United States Patent
Lee

(10) Patent No.: US 9,269,962 B2
(45) Date of Patent: Feb. 23, 2016

(54) APPARATUS AND METHOD OF PRINTING CATALYST ON ELECTROLYTE MEMBRANE

(71) Applicant: Hyundai Motor Company, Seoul (KR)

(72) Inventor: Hoseung Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/551,030

(22) Filed: Nov. 23, 2014

(65) Prior Publication Data
US 2015/0340706 A1  Nov. 26, 2015

(30) Foreign Application Priority Data
May 20, 2014 (KR) .................. 10-2014-0060536

(51) Int. Cl.
*H01M 4/88* (2006.01)
(52) U.S. Cl.
CPC .......... *H01M 4/8828* (2013.01); *H01M 4/8878* (2013.01)
(58) Field of Classification Search
CPC ..... H01M 4/8828; H01M 4/8878; B41J 2/045
USPC .............. 347/70; 427/115; 502/101
See application file for complete search history.

(56) References Cited

U.S. PATENT DOCUMENTS

| 6,669,103 B2 * | 12/2003 | Tsai .................................. 239/4 |
| 8,268,354 B2 * | 9/2012 | Truong-Le et al. ........... 424/489 |
| 2005/0098101 A1 * | 5/2005 | Shen et al. .................... 118/696 |

FOREIGN PATENT DOCUMENTS

| JP | 2007-213841 A | 8/2007 |
| KR | 10-0551136 B1 | 2/2006 |

OTHER PUBLICATIONS

Ultrasonic Atomization Technology for Precise Coatings, Sono-Tek Corporation, Milton NY USA http://www.sono-tek.com/ultrasonic-nozzle-technology/ date viewed Jul. 14, 2015.*

* cited by examiner

*Primary Examiner* — Justin Seo
*Assistant Examiner* — Michael Konczal
(74) *Attorney, Agent, or Firm* — Mintz Levin Cohn Ferris Glovsky and Popeo, P.C.; Peter F. Corless

(57) ABSTRACT

An apparatus and a method of printing catalyst on an electrolyte membrane are disclosed. The apparatus may include: a printer head provided with an ink chamber formed in the printer head so as to store an ink, an injecting hole formed at a first side of the printer head so as to inject the ink in the ink chamber, and a piezoelectric element mounted at a second side opposite to the one side of the printer head thereby injecting the ink through the injecting hole; and a vibrator generating ultrasonic energy through vibration and applying the ultrasonic energy to the ink injected through the injecting hole so as to disperse the ink uniformly.

10 Claims, 7 Drawing Sheets

APPARATUS AND METHOD OF PRINTING CATALYST ON ELECTROLYTE MEMBRANE

CROSS-REFERENCE TO RELATED APPLICATION

This application claims priority to and the benefit of Korean Patent Application No. 10-2014-0060536 filed in the Korean Intellectual Property Office on May 20, 2014, the entire contents of which are incorporated herein by reference.

TECHNICAL FIELD

The present invention relates to an apparatus and a method of printing catalyst on an electrolyte membrane. Particularly, the method of printing catalyst on an electrolyte membrane comprises dispersing ink uniformly by applying ultrasonic energy and heat to the injected ink toward the electrolyte membrane, thereby preventing swelling of the ink.

BACKGROUND

A fuel cell system generates electricity by converting chemical energy of a fuel directly into electrical energy.

The fuel cell system generally includes a fuel cell stack generating electrical energy, a fuel supply system supplying a fuel or hydrogen gas to the fuel cell stack, an air supply system supplying oxygen gas in air as an oxidizing agent of electrochemical reaction to the fuel cell stack, and devices for managing heat and water radiating heat generated from the reaction in the fuel cell stack to an exterior of the fuel cell system and controlling an operating temperature of the fuel cell stack.

In other words, the fuel cell system generates electricity by electrochemical reaction of the hydrogen gas as fuel and the oxygen gas in the air and also produces heat and water as by-products of the reaction.

The fuel cell stack which may be applied to a fuel cell vehicle includes a plurality of unit batteries arranged in sequential order. Each unit battery includes a membrane-electrode assembly (MEA) disposed at the innermost part thereof, and the membrane-electrode assembly includes an electrolyte membrane for transferring hydrogen ions and catalytic layer at each cathode and anode respectively attached at each side of the electrolyte membrane so as to react the hydrogen with the oxygen.

In addition, a gas diffusion layer (GDL) is positioned at an exterior portion of the membrane-electrode assembly (MEA), or the exterior portions where the cathode and the anode are positioned, and a separator including a flow field for supplying the fuel and the air each respectively to the cathode and the anode and exhausting water generated by the reaction is positioned at an exterior of the gas diffusion layer.

The hydrogen and the oxygen are ionized by a catalyst at each catalytic layer of the electrode, such that the hydrogen undergoes oxidation reaction so as to generate a hydrogen ion and an electron, and the oxygen ion at the cathode undergoes a reduction reaction with the hydrogen ion transferred from the anode so as to generate the water.

Since the hydrogen is supplied to the anode or alternatively "oxidation electrode" and the oxygen or air is supplied to the cathode, or alternatively "reduction electrode", the hydrogen supplied to the anode is ionized into the hydrogen ion ($H^+$) or proton and the electron ($e^-$) by the catalyst of the electrode layer. Subsequently, the hydrogen ion selectively passes through the electrolyte membrane which may be a cation-exchange membrane and may be transferred to the cathode. Simultaneously, the electron (e) is transferred to the cathode through conductors such as the gas diffusion layer and the separator.

Therefore, the hydrogen ion supplied to the cathode through the electrolyte membrane and the electron supplied to the cathode by the separator react with the oxygen in the air supplied to the cathode by an air supply so as to generate the water.

At this time, current is also generated by flow of the electrons through an external electric circuit or conducting wire driven by transferring of the hydrogen ion to the cathode. When the water is generated by the reaction, heat is also generated as reaction product.

In the related arts, the membrane-electrode assembly (MEA) is manufactured by attaching the catalyst on both surfaces of a polymer electrolyte membrane (PEM). Decal method or catalyst spraying method has been typically used to attach the catalyst on the both surface of the electrolyte membrane.

For example, in the Decal method, the catalyst is attached on the electrolyte membrane through thermo compression bonding after attaching the catalyst to a resin film. Since the membrane-electrode assembly manufactured through the Decal method has a thin catalyst layer, area between the catalyst and reacting gas may increase but manufacturing process may be complicated thereby increasing manufacturing cost and time.

In other examples, an ink containing the catalyst may be sprayed according to the catalyst spraying method. However, a homogeneous catalyst layer having uniform thickness and density may not be obtained. In addition, since the ink may be applied several times by spraying, manufacturing time may increase.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an apparatus and a method of printing catalyst on an electrolyte membrane. In one aspect, the apparatus and the method may have advantages for obtaining a homogeneous catalyst layer by directly printing an ink containing the catalyst on the electrolyte membrane. In another aspect, the apparatus and the method may have further advantages of dispersing the ink uniformly by applying ultrasonic energy and heat to the ink before the injected ink reaches the catalyst layer thereby preventing swelling of the ink.

In an exemplary embodiment, an apparatus of printing catalyst on an electrolyte membrane may include: a printer head provided with an ink chamber formed in the printer head so as to store an ink, an injecting hole formed at a first side of the printer head so as to inject the ink in the ink chamber, and a piezoelectric element mounted at a second side opposite to the first side of the printer head such that the ink is injected through the injecting hole; and a vibrator generating ultrasonic energy through vibration and applying ultrasonic energy to the ink injected through the injecting hole so as to disperse the ink uniformly.

The apparatus may further include a heater which may heat the ink around a flow of the ink injected through the injecting hole.

The vibrator may be disposed at a radial exterior of the flow of the ink injected through the injecting hole and may vibrate in a vertical direction and apply the ultrasonic energy to the flow of the ink. The vibrator may also generate the ultrasonic energy in a range of about 5 Hz to about 1000 MHz in frequency. Particularly, the vibrator may generate the ultrasonic energy in a range of about 20 kHZ to about 40 kHz in frequency.

The heater may be disposed at a radial exterior of the vibrator and may heat the flow of the ink. Particularly, the heater may heat the ink to a temperature of about 50 to about 100° C.

In an exemplary embodiment, a method of printing catalyst on an electrolyte membrane is provided. The method may include: manufacturing an ink for the catalyst; injecting the ink toward the electrolyte membrane through an injecting hole; applying ultrasonic energy to the injected ink by using a vibrator provided between the injecting hole and the electrolyte membrane; and coating the catalyst on the electrolyte membrane by applying the ink uniformly dispersed by applying ultrasonic energy in contact with the electrolyte membrane with a predetermined pattern.

In a further aspect a method of printing catalyst on an electrolyte membrane is provided, the method comprising: (a) manufacturing an ink for the catalyst; (b) injecting the ink toward the electrolyte membrane through an injecting hole; (c) applying ultrasonic energy to the injected ink by using a vibrator provided between the injecting hole and the electrolyte membrane; and (d) coating the catalyst on the electrolyte membrane by dispersing the ink comprising the catalyst uniformly while applying the ultrasonic energy, the dispersed ink contacting the electrolyte membrane in a predetermined pattern.

In a yet further aspect, a method of printing catalyst on an electrolyte membrane is provided, the method comprising: (a) injecting an ink comprising a catalyst toward an electrolyte membrane; (b) applying ultrasonic energy to the injected ink; and (c) while applying the ultrasonic energy, coating the catalyst on the electrolyte membrane by dispersing the ink uniformly on the electrolyte membrane in a predetermined pattern.

The above methods may further include heating the injected ink, including after applying or coating the ink.

The above methods may further include vaporizing solvent of the ink by heating the injected ink, including after applying or coating the ink.

The ultrasonic energy may have frequency in a range of about 20 kHz to about 40 kHZ. The frequency of the ultrasonic energy may be determined according to types of the catalyst and solvent without limitation. In addition, the solvent of the ink may be vaporized by heating the ink to a temperature of about 50 to about 100° C.

In particular, the predetermined pattern may include: a plurality of first direction lines parallel with each other; and a plurality of second direction lines crossing the first direction lines with a predetermined angle being formed with respect to the first direction lines.

The first direction lines may be parallel with a flow of fluid and the second direction lines may be vertical to the first direction lines. A distance between the neighboring second direction lines may increase or may be constant along the flow of the fluid. In addition, thicknesses of the plurality of second direction lines may decrease or may be constant along the flow of the fluid.

Alternatively, the predetermined pattern may include a plurality of direction lines. In particular, a density of the plurality of direction lines positioned at an upstream of the flow of the fluid may be greater than that of the plurality of direction lines positioned at a downstream of the flow of the flow.

According to various exemplary embodiments of the present invention, a homogeneous catalyst layer may be obtained by directly printing the ink containing the catalyst on the electrolyte membrane, and thus, thickness of the catalyst and distance between the catalysts may be easily controlled. In addition, since the ultrasonic energy and the heat is applied to the ink before the injected ink is deposited on the catalyst layer, the ink may be dispersed uniformly thereby preventing swelling. Further, since a substantial amount of the ink may be be injected at each time, manufacturing time may be shortened.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

An exemplary embodiment of the present invention will hereinafter be described in detail with reference to the accompanying drawings.

Figure 1:
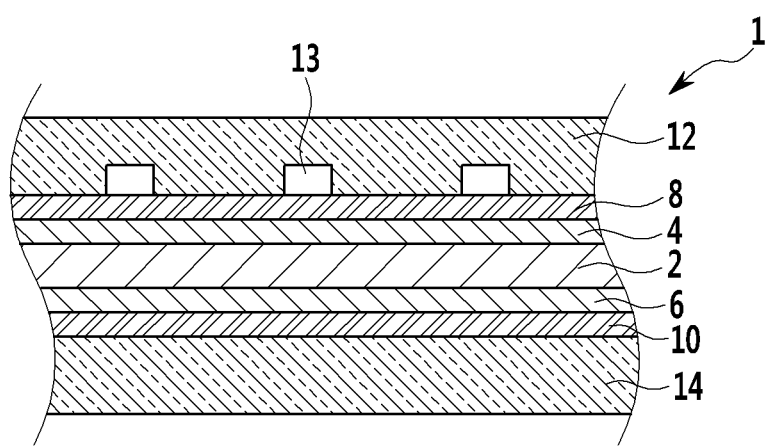
FIG. 1 illustrates a cross-sectional view of an exemplary membrane-electrode assembly.

FIG. 1 illustrates a cross-sectional view of an exemplary membrane-electrode assembly in the art. As shown in FIG. 1, a membrane-electrode assembly 1 includes an electrolyte membrane 2, catalytic layers 4 and 6, gas diffusion layers 8 and 10, and separators 12 and 14.

The electrolyte membrane 2 is positioned at a center portion of the membrane-electrode assembly 1 and only protons may pass the electrolyte membrane. The catalytic layers 4 and 6 are formed at both side surfaces of the electrolyte membrane 2. According to one aspect of the present invention, the catalytic layers 4 and 6 may be directly printed on the both side surfaces of the electrolyte membrane 2.

The catalytic layers 4 and 6 may be a cathode 4 and an anode 6, respectively. An air is supplied to the cathode 4 which may also be referred to "reduction electrode" and a hydrogen is supplied to the anode 6 which may also be referred to "oxidation electrode". The hydrogen supplied to the anode 6 is ionized into a proton ($H^+$) and electron ($e^-$) by the catalyst, and only the proton selectively passes through the electrolyte membrane 2 which is cation-exchange membrane and thus the proton is transferred to the cathode 4. Simultaneously, the electron is transferred to the cathode 4 through the gas diffusion layer 8 and the separator 12 which serve as conductors. Therefore, the proton supplied to the cathode 4 through the electrolyte membrane 2 and the electron supplied to the cathode 4 through the separators 12 and 14 react with oxygen in the air supplied to the cathode 4 thereby generating water. At this time, current is generated by flow of the electron through an external electric circuit or conducting wire driven by movement of the proton to the cathode. When the water is generated by the reaction, heat occurs incidentally.

The gas diffusion layers 8 and 10 are positioned respectively at a side surface of the cathode 4 opposite to the electrolyte membrane 2 and a side surface of the anode 6 opposite to the electrolyte membrane 2. The gas diffusion layers 8 and 10 transfer the air and the hydrogen to the cathode 4 and the anode 6, respectively.

The separators 12 and 14 are positioned at exteriors of the gas diffusion layers 8 and 10, respectively. The separators 12 and 14 are provided with flow paths 13 formed therein so as to supply the air to the cathode 4 or the hydrogen to the anode 6 and the water generated during the reaction is exhausted through the separators 12 and 14. The flow of the air and the flow of the hydrogen may be vertical to each other, but exemplary embodiments may not be limited thereto.

Figure 2:
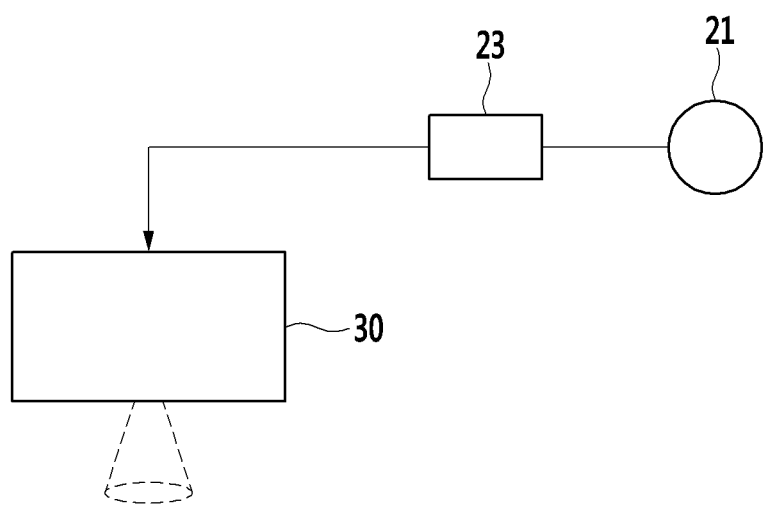
FIG. 2 illustrates an exemplary apparatus for printing catalyst on an electrolyte membrane according to an exemplary embodiment of the present invention.

FIG. 2 illustrates an exemplary apparatus for printing catalyst on an electrolyte membrane according to an exemplary embodiment of the present invention.

As shown in FIG. 2, the apparatus for printing catalyst on an electrolyte membrane may be used to print the cathode 4 and/or the anode 6 on the electrolyte membrane 2. Accordingly, the apparatus may include: an ink source 21; a first heater 23; and a printer 30.

The ink source 21 may be provided to an ink containing a catalyst therein and the ink source 32 may supply the ink to the printer 30.

The first heater 23 may be disposed between the ink source 21 and the printer 30 and may primarily heat the ink supplied from the ink source 21. In particular, the first heater 23 may heat the ink to a temperature of about 30 to about 50° C. so as to uniformly increase the temperature of the ink and promote secondary heat.

The printer 30 may inject the ink supplied from the ink source 21 to the electrolyte membrane 2 and print the catalysts 4 and 6 on the electrolyte membrane 2. The printer 30 may include a printer head 32, a vibrator 50, and a second heater 60.

Figure 3:
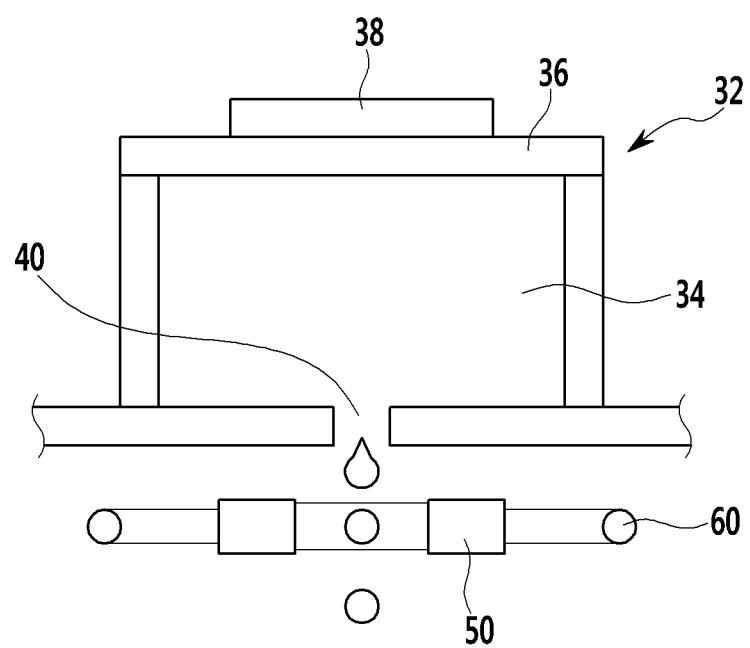
FIG. 3 illustrates a partial enlarged cross-sectional view of an exemplary apparatus for printing catalyst on an electrolyte membrane according to an exemplary embodiment of the present invention.
Figure 4:
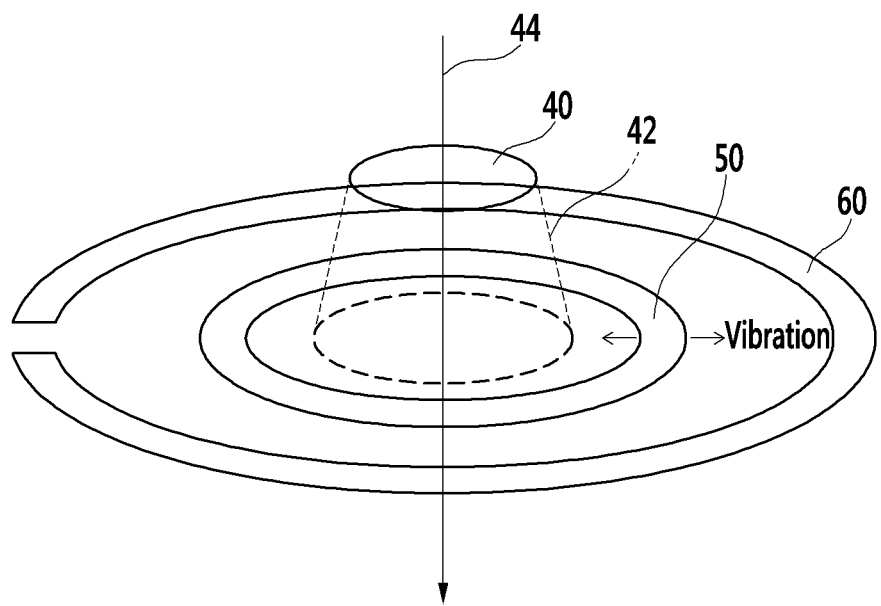
FIG. 4 illustrates an exemplary vibrator and an exemplary heater according to an exemplary embodiment of the present invention.

FIG. 3 illustrates a partially enlarged cross-sectional view of an exemplary apparatus of printing catalyst on an exemplary electrolyte membrane according to an exemplary embodiment of the present invention, and FIG. 4 illustrates an exemplary vibrator and an exemplary heater according to an exemplary embodiment of the present invention.

As shown in FIG. 3, an ink chamber 34 may be formed in the printer head 32 and may be fluidly connected to the ink source 21 so as to receive the ink from the ink source 21. The ink chamber 34 may store the ink supplied from the ink source 21 temporarily. An injecting hole 40 may be formed at a first side of the printer head 32 such that the ink in the ink chamber 34 may be injected through the injecting hole 40. In addition, a second side of the printer head 32 may be formed of a flexible member 36 and a piezoelectric element 38 may be mounted on the flexible member 36. In particular, the piezoelectric element 38 may apply pressure to the flexible member 36 on receiving current. Accordingly, the flexible member 36 may be bent toward the injecting hole 40 so as to inject the ink stored in the ink chamber 34.

The vibrator 50 may be mounted on a path through which the ink injected through the injecting hole 40 flows. The vibrator 50 may generate ultrasonic energy or wave through vibration and apply the ultrasonic energy to the ink 42 injected through the injecting hole 40 so as to mix and disperse the ink uniformly. Since the ink 42 contains solvent material and catalyst material, the ink 42 may be dispersed into microdroplets when the ultrasonic energy or wave is applied to the ink 42 and the solvent material and the catalyst material may be disposed uniformly to the microdroplets. If the catalyst material is not dispersed evenly, the catalyst material may be separated from the solvent material and be concentrated on a specific region and thus, performance of the membrane-electrode assembly 1 may be deteriorated or usage of the catalyst for manufacturing the membrane-electrode assembly 1 may increase. As such, the vibrator 50 may be mounted on the path through which the ink 42 flows and applies the ultrasonic energy to the ink 42 such that the catalyst material may be mixed with the solvent material uniformly. As shown in FIG. 4, in particular, the vibrator 50 may be disposed at a radial exterior of the ink 42 and vibrate in a direction substantially perpendicular to the flow 44 of the ink so as to apply the ultrasonic energy to the ink 42.

The vibrator 50 may generate the ultrasonic energy of in a range of about 5 Hz to about 1000 MHz in frequency, but it may not be limited thereto. Frequency of the ultrasonic energy may be determined according to types of the catalyst and the solvent. In particular, the frequency of the ultrasonic energy or wave may be in a range of about 20 kHz to about 40 kHz. Since the ink 42 typically contains alcohol solvent, the ink 42 may be effectively dispersed into the microdroplets when the ultrasonic energy in frequency of about 20 kHz to about 40 kHz is applied to the ink 42.

The vibrator may be typically used in humidifiers or washers and any vibrators generally used in the art may be used for the apparatus of the invention without limitation.

The second heater 60 may be mounted on a path through which the ink 42 injected through the injecting hole 40 flows and heat the ink 42. Since the second heater 60 may heat the ink 42 just before the ink 42 reaches the electrolyte membrane 2, the second heater 60 may vaporize at least a portion of the solvent or moisture contained in the ink 42. Since at least the portion of the solvent or moisture is vaporized from the ink 42 reaching the electrolyte membrane 2, the electrolyte membrane 2 may be prevented from absorbing the moisture and occurrence of swelling may be prevented. In addition, since the ink 42 reaching the electrolyte membrane 2 may be heated by the second heater 60, the catalyst material contained in the ink 42 may be deposited on the electrolyte membrane 2 sufficiently at elevated temperature. In particular, as shown in FIG. 4, the second heater 60 may be disposed at the radial exterior of the ink 42, particularly at a radial exterior of the vibrator 50. In addition, the second heater 60 may heat the ink 42 to a temperature of about 50 to about 100° C., but the temperature thereof may not be limited thereto. For example, heating temperature of the second heater 60 may be determined based on evaporating temperature of the water or the alcohol which may be contained in the ink 42. Alternatively, the heating temperature of the second heater 60 may be determined based on ingredient of target solvent contained in the ink 42. The second heater 60 may be a heating wire, but examples thereof may not be limited thereto.

The vibrator 50 and the second heater 60 may be mounted at the printer head 32 or be disposed separately from the printer head 32.

A method of printing catalyst on an electrolyte membrane according to an exemplary embodiment of the present invention will hereinafter be described in detail.

Figure 5:
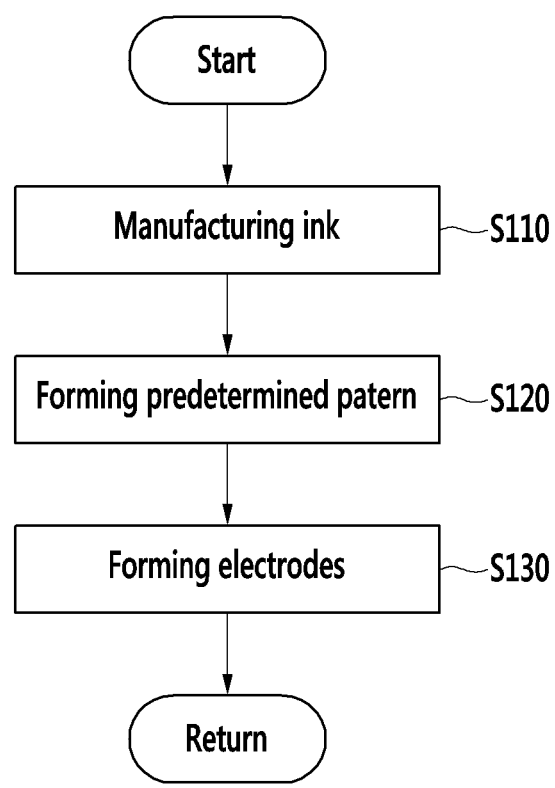
FIG. 5 is a flowchart of an exemplary method of printing catalyst on an electrolyte membrane according to an exemplary embodiment of the present invention.
Figure 6:
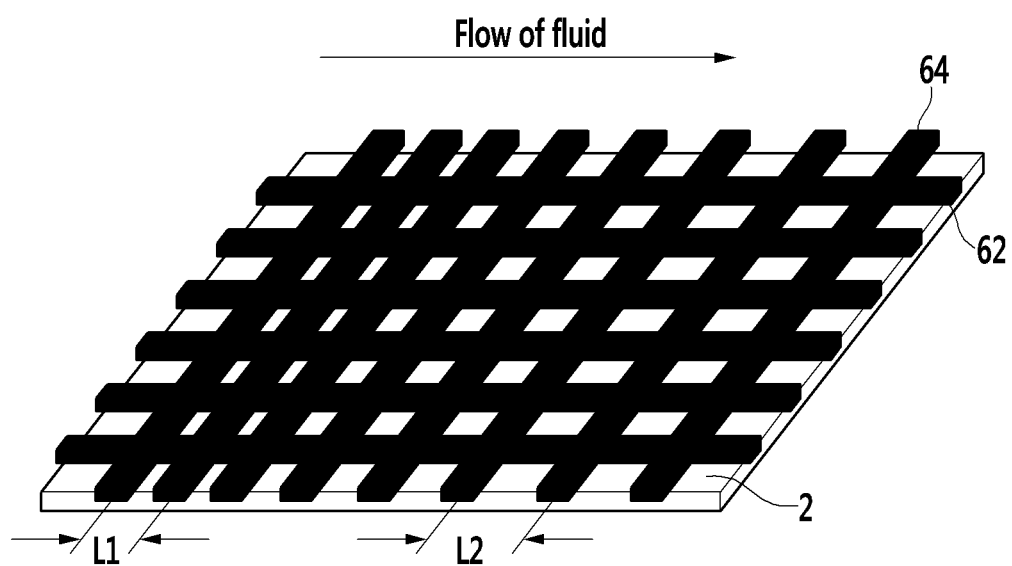
FIG. 6 illustrates an exemplary electrolyte membrane on which catalyst is printed according to an exemplary embodiment of the present invention.
Figure 7:
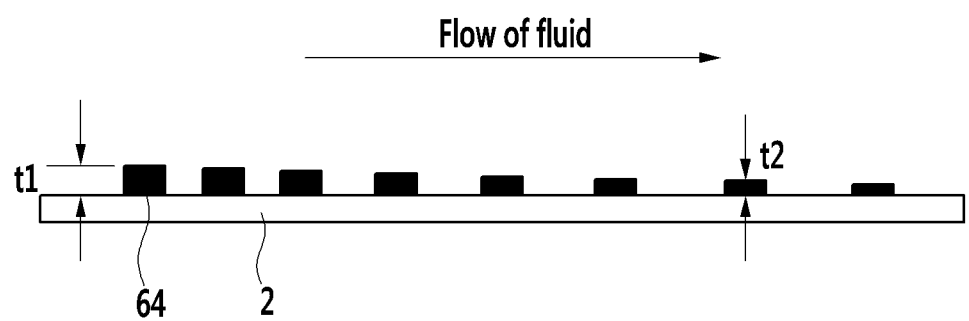
FIG. 7 is a cross-sectional view of an exemplary electrolyte membrane on which catalyst is printed according to an exemplary embodiment of the present invention.

FIG. 5 shows an exemplary method of printing catalyst on an electrolyte membrane according to an exemplary embodiment of the present invention, FIG. 6 illustrates an exemplary electrolyte membrane on which catalyst is printed according to an exemplary embodiment of the present invention, and FIG. 7 illustrates a cross-sectional view of an exemplary electrolyte membrane on which catalyst is printed according to an exemplary embodiment of the present invention.

As shown in FIG. 5, the method may include manufacturing the ink 42 containing the catalyst material at step S110. The ink 42 may include the catalyst and the solvent.

The catalyst may be formed by attaching the catalyst material on a carrier. Noble metal material such as platinum or ruthenium may be particularly used as the catalyst material, but the catalyst material may not be limited thereto. In addition, the catalyst may be manufactured with carbonaceous material such as carbon black, carbon nanotube, mesoporous carbon, nano diamond, graphene and like, nonmetallic oxide material such as titanium oxide, nitride, boride, tin oxide, indium tin oxide (ITO), silicon oxide, tungsten oxide, tungsten carbide, zirconium sulfide and on the like, and/or conductive polymer material. Furthermore, grain size of the catalyst may be of about 50 μm or less. The grain size of the catalyst may be determined based on thickness of the electrolyte membrane 2 and possibility of manufacturing the carrier.

The solvent may be a liquid for flowability of the ink 42. The solvent may be manufactured with polymer resin material such as sulfonated tetrafluoroethylene based fluoropolymer-copolymer, epoxy, polymethyl methacrylate, polydimethylsilozane, polydimethylglutarimide, silicon resin, etc, deionized water, and/or ethanol. It is also appreciated that Nafion® (DuPont, USA) may provide a suitable option for the sulfonated tetrafluoroethylene based fluoropolymer-copolymer as described above. After the catalyst is manufactured, the catalyst may be mixed and dispersed into the solvent thereby manufacturing the ink 42. The manufactured ink 42 may be stored in the ink source 21.

Subsequently, the apparatus forms a predetermined pattern by injecting the ink 42 onto the electrolyte membrane 2 at step S120. The first heater 23 may primarily heat the ink 42 supplied from the ink source 21 to the printer 30 for printing the catalysts 4 and 6 on the electrolyte membrane 2. As described above, the first heater 23 may heat the ink 42 to a temperature of about 30 to about 50° C. so as to make the temperature of the ink 42 uniform and promote secondary heat.

The ink 42 supplied to the printer 30 may be supplied to the ink chamber 34. If a controller (not shown) applies a signal to the piezoelectric element 38, the ink 42 in the ink chamber 34 may be injected through the injecting hole 40. In addition, the controller may supply a signal to the vibrator 50 and the second heater 60 so as to apply the ultrasonic energy and heat to the injected ink 42. As such, the ink 42 may be dispersed into the microdroplets by the vibrator 50 and the solvent and the catalyst may be mixed with each other uniformly. In addition, at least some solvent may be vaporized by the heater 60.

In particular, the printer head 32 may move along a predetermined pattern and deposit the catalyst on the electrolyte membrane 2 according to the predetermined pattern. FIG. 6 and FIG. 7 illustrate the catalyst deposited on the electrolyte membrane 2 according to an exemplary predetermined pattern. As shown in FIG. 6 and FIG. 7, the exemplary predetermined pattern may include a plurality of first direction lines 62 and a plurality of second direction lines 64. The plurality of first direction lines 62 may be parallel to each other and the plurality of second direction lines 64 may also be parallel to each other. In addition, each of the first direction lines 62 and each of the second direction lines 64 may be crossed at a predetermined angle. For example, as shown in FIG. 6 and FIG. 7, the first direction lines 62 may be parallel with a flow of fluid and the second direction lines 64 may be vertical to the flow of the fluid.

Distances L1 and L2 between the first direction lines 62 or the second direction lines 64 may increase or be constant along the flow of the hydrogen or air fluid. In other words, the distance L1 between the first direction lines 62 or the second direction lines 64 at an upstream thereof may be less than or equal to that L2 between the first direction lines 62 or the second direction lines 64 at a downstream thereof. Since the hydrogen or oxygen fluid is greater at the upstream than that at the downstream, density of the direction lines at the upstream may be elevated so as to speed up the reaction at the upstream. Alternatively, thicknesses t1 and t2 of the first direction lines 62 or the second direction lines 64 may decrease or be constant along the flow of the hydrogen or air fluid. In other words, the thickness t1 of the first direction line 62 or the second direction line 64 at the upstream may be thicker than or equal to that t2 of the first direction line 62 or the second direction line 64 at the downstream. In addition, widths of the lines 62 and 64 may be about 20 μm, the distances between the lines 62 and 64 may be about 20 μm (L1) at the upstream and about 70 μm (L2) at the downstream, and thicknesses of the lines 62 and 64 may be about 20 μm (t1) at the upstream and about 200 nm (t2) at the downstream. In various exemplary embodiments, each of the widths of the lines 62 and 64 and the distances between the lines 62 and 64 may be in a range from about 10 μm to about 1 mm, and the thicknesses of the lines 62 and 64 may be in an range from about 10 nm to about 100 μm. The thicknesses of the lines 62 and 64 may also be controlled by the number of printings.

The apparatus of printing the catalyst on the electrolyte membrane may further include a third heater (not shown) which may heat the ink 42 printed on the electrolyte membrane 2 and deposit the catalysts 4 and 6 on the electrolyte membrane 2.

When the predetermined pattern is formed, the gas diffusion layers 8 and 10 and the separators 12 and 14 may be mounted on the both sides of the electrolyte membrane 2 on which the catalysts 4 and 6 may be deposited so as to form electrodes at step S130. Generally known methods in the art may be used to form the electrodes without limitation.

The controller may be constructed with one or more processors activated by a predetermined program, and the predetermined program may be programmed to perform each step of the method of printing the catalyst on the electrolyte membrane according to various exemplary embodiments of the present invention. In particular, the controller may control operation of the first heater 23, the vibrator 50, the second heater 60, the third heater, and the printer 30, and the predetermined pattern may be stored in the controller.

In addition, the predetermined pattern described herein may be an example and the spirit of the present invention is not limited to the example described herein. In particular, the predetermined pattern may have the same or similar shape to fluid lines supplying gas or may have any shape invented by a person of an ordinary skill in the art so as to optimize the reaction at the catalysts regardless of the fluid lines. Particularly as used herein, density may refer to thicknesses of direction lines and distances between the direction lines without limitation and a plurality of direction lines may be, but not limited to, the first and second direction lines. The density positioned at the upstream of the flow of the fluid may be greater than that of a plurality of direction lines positioned at the downstream of the flow of the fluid.

While this invention has been described in connection with what is presently considered to be practical exemplary embodiments, it is to be understood that the invention is not limited to the exemplary embodiments, but, on the contrary, is intended to cover various modifications and equivalent arrangements included within the spirit and scope of the appended claims.

What is claimed is:

1. A method of printing catalyst on an electrolyte membrane, comprising:
   manufacturing an ink for the catalyst;
   injecting the ink toward the electrolyte membrane through an injecting hole;
   applying ultrasonic energy to the injected ink by using a vibrator provided between the injecting hole and the electrolyte membrane; and
   coating the catalyst on the electrolyte membrane by dispersing the ink comprising the catalyst uniformly while applying the ultrasonic energy, the dispersed ink contacting the electrolyte membrane in a predetermined pattern.

2. The method of claim 1, further comprising vaporizing solvent of the ink by heating the injected ink.

3. The method of claim 2, wherein the solvent of the ink is vaporized by heating the ink to a temperature of about 50 to about 100° C.

4. The method of claim 1, wherein the predetermined pattern comprises:
   a plurality of first direction lines parallel with each other; and
   a plurality of second direction lines crossing the first direction lines at a predetermined angle being formed with respect to the first direction lines.

5. The method of claim 4, wherein the first direction lines are parallel with a flow of fluid and the second direction lines are vertical to the first direction lines.

6. The method of claim 5, wherein a distance between the adjacent second direction lines increases or is constant along the flow of the fluid.

7. The method of claim 5, wherein thicknesses of the plurality of second direction lines decrease or are constant along the flow of the fluid.

8. The method of claim 1, wherein the ultrasonic energy has frequency in a range of about 20 kHz to about 40 kHZ.

9. The method of claim 1, wherein frequency of the ultrasonic energy is determined based on types of the catalyst and solvent.

10. The method of claim 1, wherein the predetermined pattern includes a plurality of direction lines, and
   wherein a density of the plurality of direction lines positioned at an upstream of the flow of the fluid is greater than that of the plurality of direction lines positioned at a downstream of the flow of the flow.

* * * * *